Patented Sept. 24, 1940

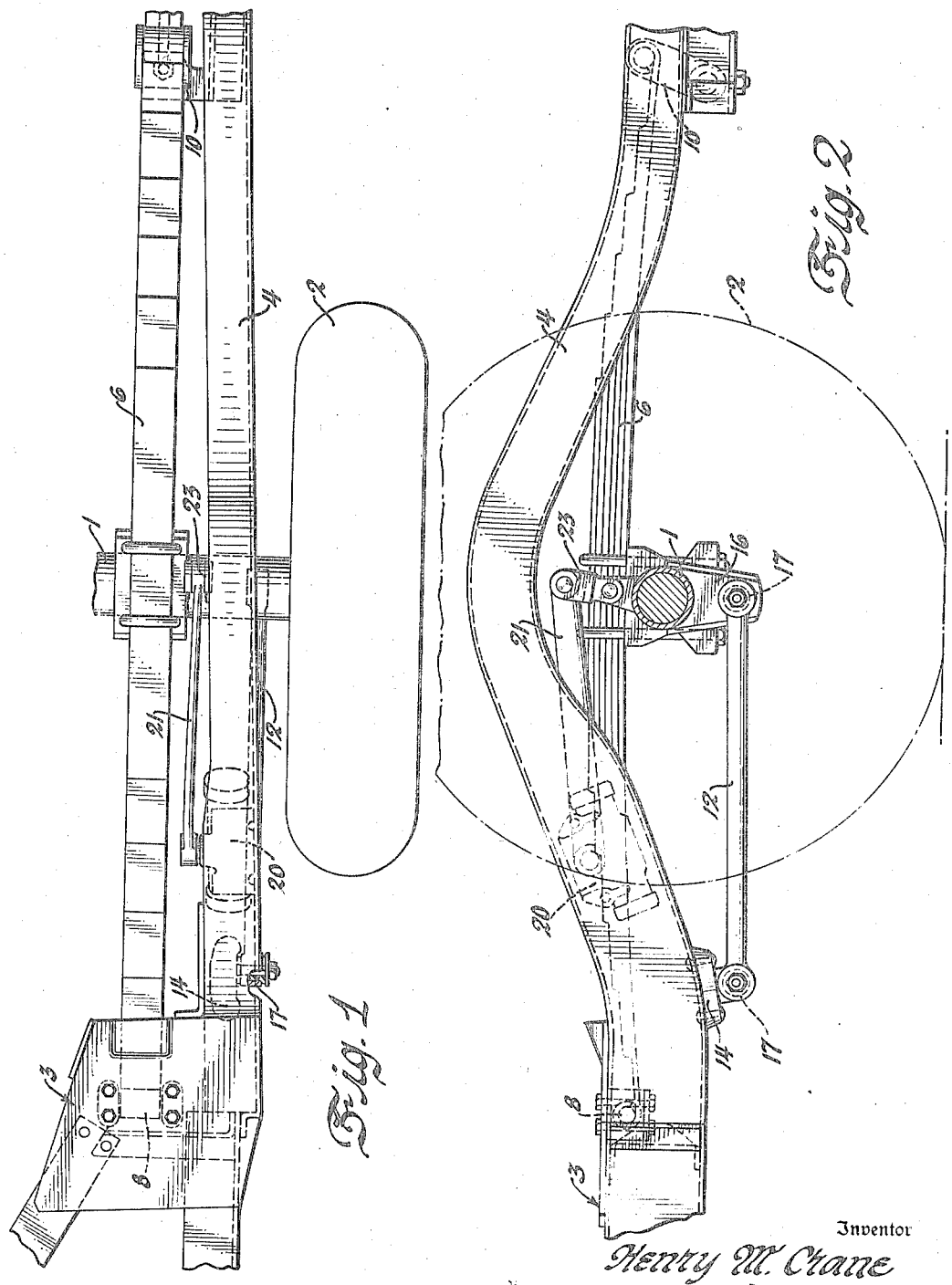

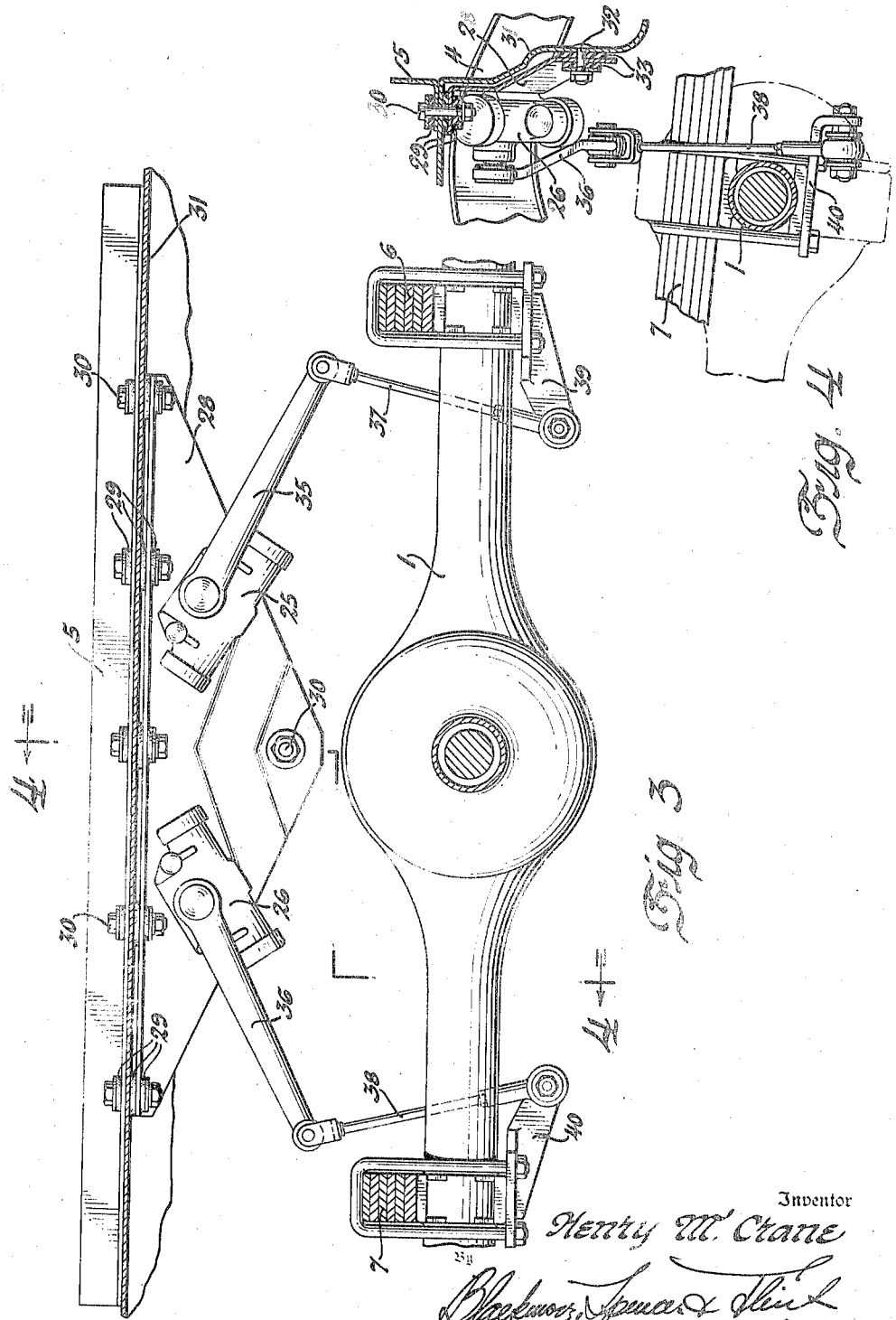

2,215,826

UNITED STATES PATENT OFFICE 2,215,826

VEHICLE SUSPENSION SYSTEM

Henry M. Crane, New York, N. Y., assignor to General Motors Corporation, Detroit, Mich., a corporation of Delaware Application January 27, 1940, Serial No. 315,904
In Great Britain January 13, 1939

5 Claims. (Cl. 280—124)

This invention relates to vehicle suspension systems and particularly to rear axle suspension systems. More particularly it relates to a rear axle suspension system which is especially suitable for use on a vehicle having independent suspension of the front wheels.

The object of the invention is a suspension system for an axle carrying road wheels on opposite sides of a vehicle, having a high roll center such that when the vehicle rolls in turning a corner, the centrifugal moment tending to cause rolling of the suspended part of the vehicle relatively to the wheels, is reduced.

Another object of the invention is a suspension system in which as the vehicle rolls in turning a corner that end of the rear axle to the outside of the curve will be pulled forward slightly so that the rear axle will have an understeering effect giving a greater degree of stability.

A still further object of the invention is a special disposition of the shock absorbers for a suspension system of the foregoing kind in which the effectiveness of the shock absorbers in checking roll is reduced without affecting their control characteristics on the "ride" of the vehicle.

According to the invention the suspension system includes a rigid rear axle between the two rear wheels of the vehicle, with longitudinally disposed leaf springs attached to the top of the axle towards its opposite ends. The leaf springs are spaced somewhat closer together than usual and a less distance apart than the longitudinal frame members of a vehicle as normally constructed. The forward ends of the springs are pivoted to fixed pivots on the vehicle frame, and their rearward ends are connected to the frame through a tension shackle. Radius arms, directed forwardly from the axle, have their opposite ends respectively, pivotally connected to the vehicle frame and to the axle, towards its opposite ends. They slope downwardly in a forward direction when the springs are in their normal loaded position and control the necessary movement of the rear axle.

Because the springs have been attached to the top of the axle and the four points of connection of the ends of the springs to the vehicle frame have been raised, the roll center which is about in the plane containing these four points of connection, is also raised. Since the raising of the roll center brings this center closer to the horizontal plane of the center of gravity of the suspended mass of the vehicle, there is less tendency for the vehicle to roll in turning a corner.

It is however, very desirable that the road wheel couples at the respective front and rear ends of the vehicle which together oppose the total rolling couple, should be substantially equal for stability. In a vehicle with a rigid rear axle and with independent suspension of the front wheels of the usual kind, in which the front wheels move in planes parallel to the normally vertical longitudinal mid-plane of the vehicle, the roll axis is inclined downwards towards the front end of the vehicle and in such a case the resistance to roll at the front end of the vehicle should be greater than the resistance to roll at the rear end of the vehicle. When therefore, a rear suspension system of the foregoing kind having a raised roll center is used in a vehicle having independent suspension of the front wheels, the resistance to roll at the rear end of the vehicle should be decreased, so that the road wheel couples at the respective front and rear ends may remain substantially equal. This is achieved by the applicant's spring spacing which is narrower than usual so that the "rotary stiffness" or the resistance to rolling at the rear of the vehicle is reduced.

For the same reason and as shown in a preferred arrangement according to the applicant's invention, the connections of the shock absorbers to the body of the vehicle may be spaced more narrowly than normally to reduce their lever arm advantage in resisting roll. In this way, while the effectiveness of both the springs and the shock absorbers in controlling vertical deflections of the body relative to the wheels is unaffected, their effectiveness in resisting roll has been reduced.

The drawings show one embodiment of a structure according to the invention and a modification thereof.

In the drawings Fig. 1 is a plan view and Fig. 2 is a part sectional side elevation, of one side of a motor vehicle having a rear end suspension according to the invention.

Fig. 3 is a part sectional view looking from the front towards the rear of a motor vehicle and showing a rear axle and associated parts of a modified form of the invention with a preferred disposition of the shock absorbers.

Fig. 4 is a part sectional view on line 4—4 of Fig. 3.

Only the left hand side of a suspension system according to the invention has been shown in Figs. 1 and 2, but it will be appreciated that the axle 1 is a rigid rear axle with wheels such as 2 on opposite sides of the vehicle, and that the parts illustrated are similar on opposite sides of the vehicle.

The vehicle body includes a frame 3 having side members such as 4 as shown in Figs. 1 and 2, and a transverse body sill 5 as shown in Figs. 3 and 4.

Leaf springs 6 and 7 are secured to the top of the axle towards its opposite ends as shown in Fig. 3.

Referring to Figs. 1 and 2, the leaf springs such as 6 are positioned to the inside of the frame side members such as 4, instead of being mounted directly beneath the frame side members, and are thus more narrowly spaced than usual. The forward ends of the springs are connected to fixed pivots such as 8 on the vehicle frame and their rear ends are connected by tension shackles such as 10 to the frame side members.

It will be noted that the four points of connection of the ends of the springs to the fixed pivots and the shackles will lie in a plane which intersects the vertical plane of the wheel centers in a line not lower than the wheel centers, and higher than usual, so that the roll center of the rear end of the vehicle is raised.

Other things being equal, the raising of the roll center increases that proportion of the total rolling couple borne by the rear tires when the vehicle rolls in making a turn, but it reduces the tendency to roll, while the closer spacing of the rear springs reduces the "rotary stiffness" or the resistance to rolling at the rear of the vehicle so that the proportionality of the road wheel couples at the respective front and rear ends of a vehicle is not necessarily disturbed.

Radius arms such as 12, which are, in their normal position, directed forwardly and slightly downwardly from the axle 1, have their opposite ends respectively pivotally connected to the vehicle frame and to the axle towards its opposite ends, to assist the springs in taking braking and torque reaction forces.

The forward ends of each radius arm such as 12 are pivotally connected to brackets such as 14 on the vehicle frame and the rearward ends of each radius arm are pivotally connected to brackets such as 16 secured to the underside of the axle 1.

Resilient bushings such as 17 of rubber or the like in the pivotal connections of the radius arms provide for a degree of controlled flexibility therein.

The radius arms and the forward halves of the springs together constitute opposite sides of articulated trapezoidal linkages controlling the motion of the opposite ends of the axle. The forwardly downward inclination of the radius arms, in conjunction with the fixed pivots for the somewhat forwardly and downwardly inclined forward halves of the springs, ensures that the axle will move in an arc of a circle about a virtual center below the level of the wheel centers, and that the end of a rear axle to the outside of a curve will be pulled forward a greater extent than the other end of the rear axle to give the required understeering effect of the rear axle for stability.

It will be appreciated that, because the trapezoidal linkages at each end of the axle are not parallelograms, the links formed by the front half of the springs and the radius arms will tend to twist the axle upon deflection thereof relatively to the frame, to an extent depending on their rigidity. In roll, the opposite ends of the axle will tend to be twisted in opposite directions. The torsional stiffness of the rear axle therefore controls its roll rigidity or resistance to rolling at the rear of the vehicle to an extent depending on the rigidity or lack of longitudinal flexbility of the links. The resilient bushings in the pivotal connections of the radius arms are suitably selected to give the radius rods any desired degree of longitudinal flexibility to control the rotary stiffness, or roll rigidity, of the rear end of the vehicle, as well as to provide the requisite degree of universal movement to permit unequal deflections of the opposite ends of the axle relatively to the frame.

Shock absorbers such as 20 are secured to the frame side members 4. The ends of the actuating arms such as 21 of the shock absorbers are pivotally connected to links such as 23 which are pivotally connected to the axle towards its opposite ends.

Referring now to Figs. 3 and 4 showing a preferred disposition of the shock absorbers, the parts with the exception of the shock absorbers and their connections are essentially the same as those thus far described in Figs. 1 and 2. In Figs. 3 and 4, the shock absorbers 25 and 26 are secured to a transversely disposed plate 28, which is connected to the transverse body sill 5, with the interposition of rubber washers 29, by bolts 30, and to an apron member 31 forming part of the body, by a bolt 32 with interposed rubber washers 33. The shock absorbers 25 and 26 are in narrowly spaced relationship on opposite sides of the vertical longitudinal mid-plane of the vehicle and their actuating arms 35 and 36, in their normal position, are outwardly and downwardly directed from the shock absorbers, to links 37 and 38, which have their opposite ends respectively pivotally connected to the outer ends of the arms 35 and 36 and to brackets 39 and 40 which are rigidly secured to the axle 1, towards its opposite ends.

As heretofore pointed out, the close spacing of the shock absorber connections on the vehicle body reduces their lever arm advantage in resisting rolling of the body when rounding a turn while leaving their effectiveness in controlling vertical deflections of the body relatively to the wheels unaffected.

I claim:

1. In a vehicle suspension system in combination, a vehicle frame including side members, a rear axle carrying road wheels at opposite sides of the vehicle, longitudinally disposed leaf springs attached to the top of the axle towards its opposite ends, fixed pivots on the vehicle frame for the front ends of said leaf springs, tension shackles between the rear ends of said springs and the vehicle frame, said springs being somewhat narrowly spaced on opposite sides of the normally vertical longitudinal mid-plane of the vehicle a lesser distance apart than the frame side members, the points of connection of said leaf springs to the fixed pivots and the shackles lying in a plane which intersects the vertical plane of the wheel centers in a line not lower than the wheel centers, and radius arms directed forwardly and downwardly from below the axle, to the vehicle body, having their opposite ends respectively pivotally connected to the vehicle frame and to the axle towards its opposite ends.

2. In a vehicle suspension system in combination, a vehicle frame including side members, a rear axle carrying road wheels at opposite sides of the vehicle, longitudinally disposed leaf springs attached to the top of the axle towards its opposite ends, fixed pivots on the vehicle frame for the front ends of said leaf springs, tension shackles between the rear ends of said springs and the vehicle frame, said springs being somewhat narrowly spaced on opposite sides of the normally vertical longitudinal mid-plane of the vehicle a lesser distance apart than the frame side members, the points of connection of said leaf springs to the fixed pivots and the shackles lying in a plane which intersects the vertical plane of the wheel centers in a line not lower than the wheel centers, and radius arms directed forwardly and downwardly from below the axle, to the vehicle body, having their opposite ends respectively pivotally connected to the vehicle frame and to the axle towards its opposite ends, there being rubber bushings in the pivotal connections of the radius arms to provide for a degree of controlled flexibility therein.

3. In a vehicle suspension system, in combination, a vehicle body including a frame, a rear axle carrying road wheels at opposite sides of the vehicle, longitudinally disposed leaf springs attached to the top of the axle towards its opposite ends, fixed pivots on the vehicle body for the front ends of said leaf springs, tension shackles between the rear ends of said springs and the vehicle body, radius arms in their normal position directed forwardly and downwardly from the axle to the vehicle body, having their opposite ends respectively, pivotally connected to the vehicle body and to the axle towards its opposite ends, and shock absorbers connecting the axle and the vehicle body; the connections of said shock absorbers to the vehicle body being spaced on opposite sides of the normally vertical longitudinal mid-plane of the vehicle a lesser distance apart than the springs.

4. The combination according to claim 3, in which the shock absorbers are mounted on a transversely disposed plate which is resiliently secured to the vehicle body.

5. In a vehicle having a roll axis which is downwardly inclined toward the front end of the vehicle, in combination, a body including a frame, a rear axle carrying road wheels at opposite sides of the vehicle, longitudinally disposed leaf springs attached to the top of the axle towards its opposite ends, fixed pivots on the frame for the front ends of said leaf springs, tension shackles between the rear ends of said springs and the frame, said springs being somewhat narrowly spaced on opposite sides of the normally vertical longitudinal mid-plane of the vehicle, the points of connection of said leaf springs to the fixed pivots and the shackles lying in a plane which intersects the vertical plane of the wheel centers in a line not lower than the wheel centers, and radius arms directed forwardly and downwardly from below the axle, to the frame, having their opposite ends respectively pivotally connected to the frame and to the axle towards its opposite ends, there being rubber bushings in the pivotal connections of the radius arms to provide for a degree of controlled flexibility therein.

HENRY M. CRANE.